United States Patent [19]
Ananthasivan et al.

[11] Patent Number: 6,070,489
[45] Date of Patent: Jun. 6, 2000

[54] MOUNTING ASSEMBLY FOR AN ADJUSTABLE PEDAL

[75] Inventors: Sundar Ananthasivan, Farmington Hills, Mich.; Christopher J. Rixon, Tecumseh, Canada

[73] Assignee: Teleflex Incorporated, Plymouth Meeting, Pa.

[21] Appl. No.: 09/178,964

[22] Filed: Oct. 26, 1998

[51] Int. Cl.[7] .................................................. G05G 1/14
[52] U.S. Cl. .............................................. 74/512; 74/560
[58] Field of Search ............................ 74/560, 512, 513, 74/514; 180/335, 274, 275

[56] References Cited

U.S. PATENT DOCUMENTS

| | | | |
|---|---|---|---|
| 4,637,741 | 1/1987 | Gillet | 74/512 X |
| 4,875,385 | 10/1989 | Sitrin . | |
| 4,989,474 | 2/1991 | Cicotte et al. . | |
| 5,078,024 | 1/1992 | Cicotte et al. . | |
| 5,460,061 | 10/1995 | Redding et al. . | |
| 5,531,135 | 7/1996 | Dolla . | |
| 5,588,338 | 12/1996 | Carr et al. | 74/560 |
| 5,615,749 | 4/1997 | Kato | 180/274 |
| 5,632,183 | 5/1997 | Rixon et al. . | |
| 5,632,184 | 5/1997 | Callicutt et al. . | |
| 5,848,558 | 12/1998 | Isono et al. | 74/512 |

FOREIGN PATENT DOCUMENTS

| | | | |
|---|---|---|---|
| 3533420 | 3/1987 | Germany | 74/512 |
| 4112132 | 10/1991 | Germany | 74/512 |
| 4112133 | 10/1991 | Germany | 74/512 |
| 4409285 | 10/1994 | Germany . | |
| 4409324 | 10/1994 | Germany . | |

*Primary Examiner*—Mary Ann Battista
*Attorney, Agent, or Firm*—Howard & Howard

[57] ABSTRACT

A pedal assembly (12) for a vehicle (10) includes a bracket (16), a pedal arm (20) and a support mechanism (26). The bracket (16) is adapted to be mounted to a vehicle structure (18) such as firewall or vehicle dashboard assembly. The pedal arm (20) extends downwardly from the bracket (16) to a distal end (22) for supporting a pedal pad (24). The support mechanism (26) interconnects the pedal arm (20) and the bracket (16) for allowing pivotal movement of the pedal arm (20) in an operating plane (28) relative to the bracket (16) during normal operation and for guiding the pedal arm (20) out of the operating plane (28) in response to a predetermined force between the pedal arm (20) and the bracket (16). Thus, under normal operation the pedal assembly (12) is pivotally moved between a rest position and a use position, but when the load exerted on the pedal pad (24) exceeds a pre-determined force the support mechanism (26) moves the pedal assembly (12) laterally with respect to the bracket (16) so that the pedal assembly (12) is moved away from a vehicle driver (14).

11 Claims, 4 Drawing Sheets

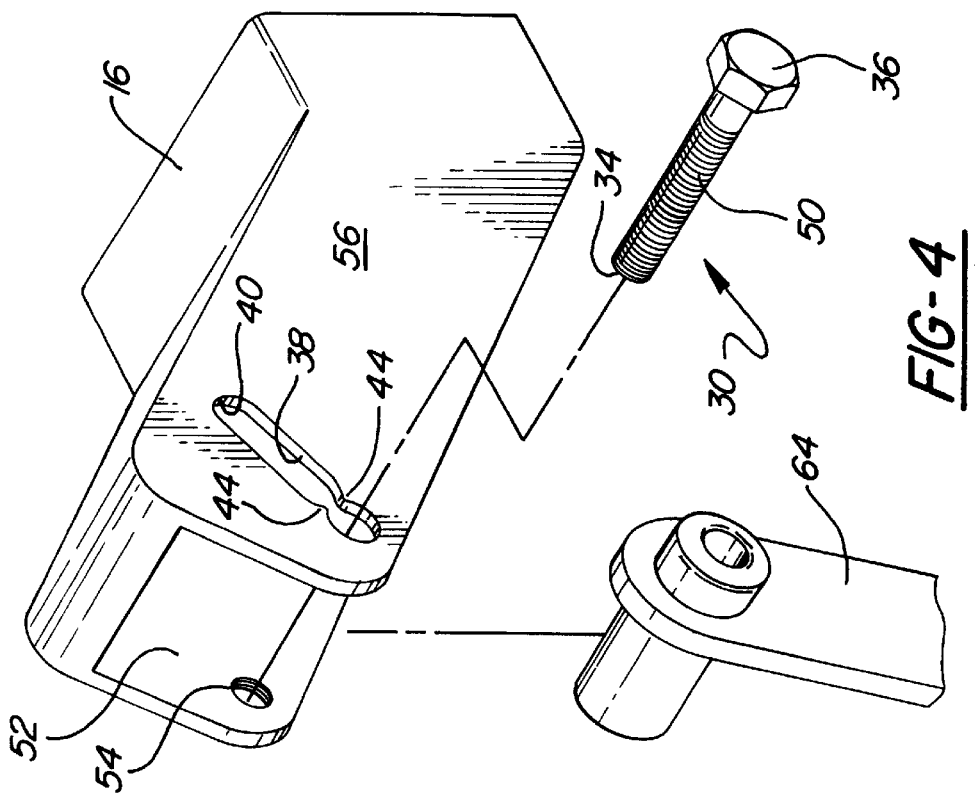
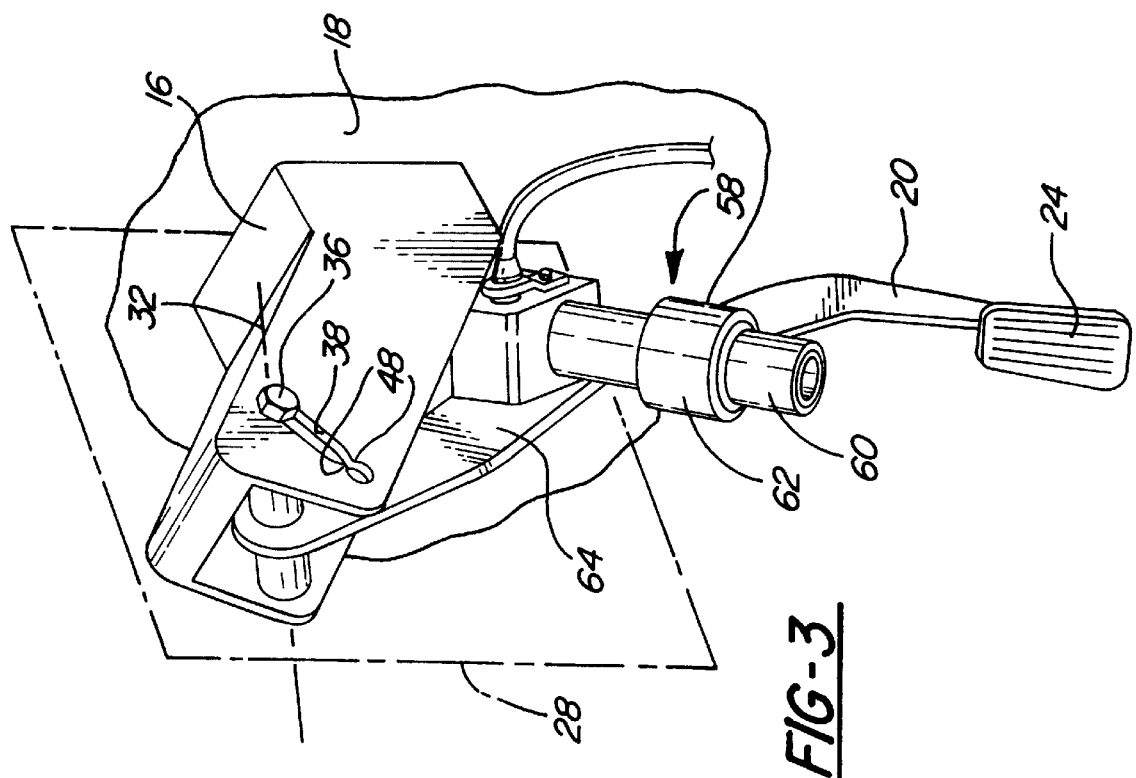

US 6,070,489

MOUNTING ASSEMBLY FOR AN ADJUSTABLE PEDAL

TECHNICAL FIELD

The subject invention relates to a support mechanism used in a vehicle pedal assembly. Specifically, the support mechanism is capable of withstanding normal vehicle loading under normal vehicle operating conditions but is designed to include a built-in initial failure mode to control movement of the pedal assembly components when the vehicle is in a collision.

BACKGROUND OF THE INVENTION

Pedal assemblies are used in vehicles to control the movement of the vehicle. For example, a vehicle driver applies a force to a brake pedal to move the pedal from a rest position to a use position. In the use position, the brake pedal actuates a vehicle braking system, which slows or stops the vehicle. Often these pedal assemblies include an adjustment apparatus that allows the position of a pedal arm and/or a pedal pad to be moved with respect to the driver. This allows the pedal assembly to accommodate drivers of various heights. Thus, the adjustment apparatus allows the pedal assembly to be moved closer to the driver when the driver is short and allows the pedal assembly to be moved further away from the driver when the driver is tall.

The pedal assembly must be capable of withstanding normal pedal forces that occur during the normal operation of the vehicle. The pedal assembly is connected to the vehicle by a support mechanism. The pedal arm is usually pivotally mounted to this support mechanism to allow pivotal movement of the pedal arm between the rest and use positions. When the driver presses down hard on the pedal pad, such as when the driver is attempting to avoid colliding with another vehicle or some other object, the large force that is exerted on the pedal pad is transferred to the support mechanism.

In known pedal assemblies, when the vehicle is in a collision, the driver typically has braced himself against the pedal pad in an attempt to stop the vehicle and avoid the collision. But if the vehicle actually hits another object, a large force is exerted against the driver via the pedal assembly. In other words, the driver is exerting a force on the pedal from one direction while a collision force is being exerted on the pedal assembly from an opposing direction. Usually the collision force is greater than the force exerted by the driver on the pedal pad. This can result in the pedal assembly being forced upwardly toward the driver causing various pedal components to contact and possibly injure the driver. This is especially important with pedal assemblies that include an adjustment apparatus because there are more pedal components that can potentially injure the driver.

Thus, it is desirable to have a pedal assembly with a support mechanism that allows the pedal to pivot between rest and use positions during normal vehicle operation, but which is designed to move the pedal assembly away from the vehicle driver when the vehicle is in a collision.

SUMMARY OF THE INVENTION AND ADVANTAGES

A pedal assembly includes a bracket, a pedal arm, and support mechanism. The bracket is adapted to be mounted to a vehicle structure. The pedal arm extends downwardly from the bracket to a distal end for supporting a pedal pad. The support mechanism interconnects the pedal arm and the bracket for allowing pivotal movement of the pedal arm in an operating plane relative to the bracket during normal operation and for guiding the pedal arm out of the operating plane in response to a predetermined force between the pedal arm and the bracket.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a perspective view of the pedal assembly bent out of the operating plane;

FIG. 4 is a partial exploded view of the pedal assembly shown in FIG. 2;

DETAILED DESCRIPTION OF THE PREFERRED EMBODIMENT

Figure 1:
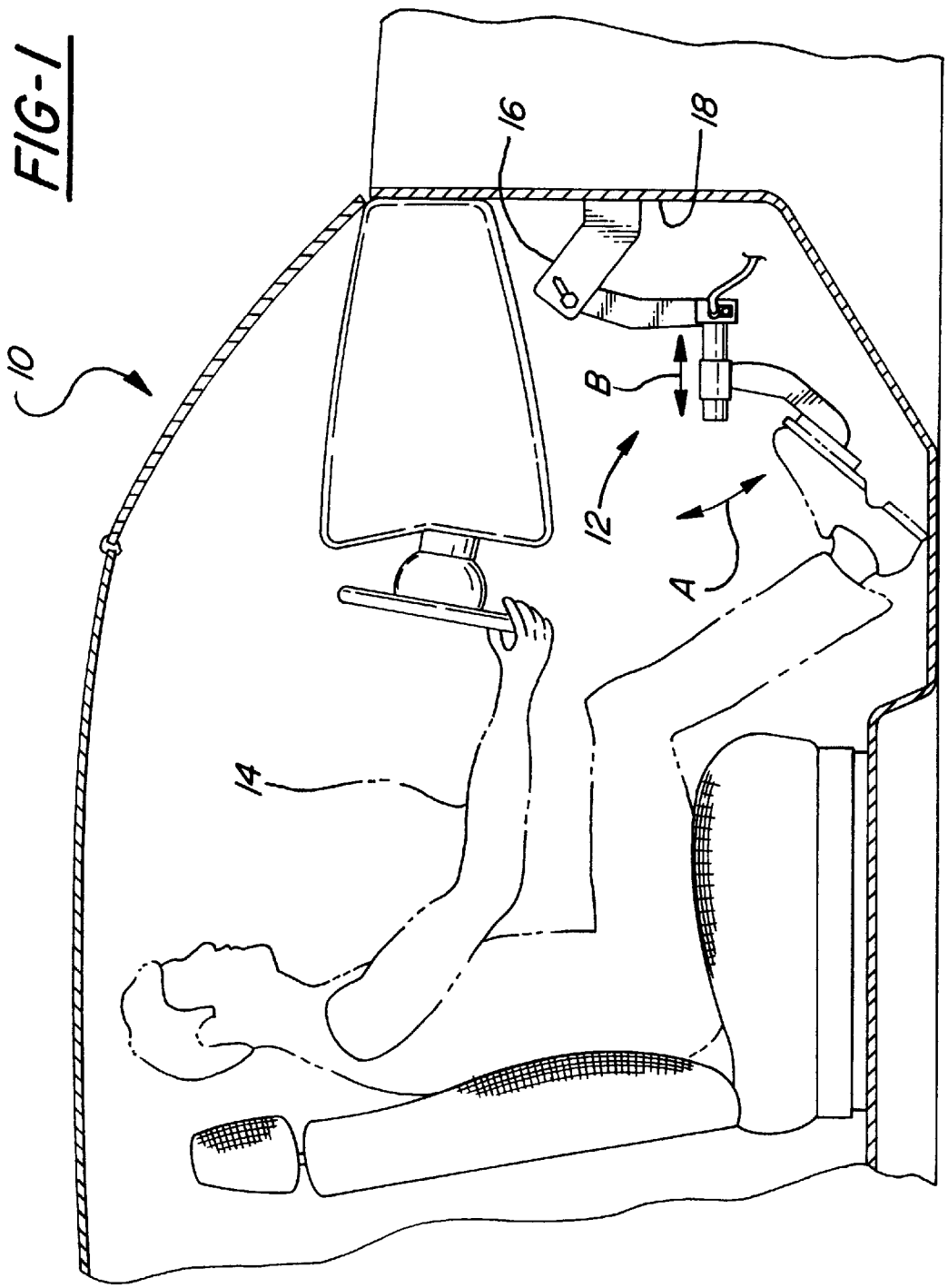
FIG. 1 is a side view of a vehicle including the subject pedal assembly.

Referring to the Figures, wherein like numerals indicate like or corresponding parts throughout the several views, a vehicle is shown generally at 10 in FIG. 1. The vehicle 10 includes a pedal assembly 12 that is moved between a rest position and a use position by a vehicle driver 14. In the use position, the pedal assembly 12 actuates a vehicle system (not shown), such as a braking system for example, which controls movement of the vehicle 10.

The pedal assembly 12 includes a bracket 16 adapted to be mounted to a vehicle structure 18 such as a firewall or dashboard assembly. The pedal assembly 12 is shown in greater detail in FIG. 2. A pedal arm 20 extends downwardly from the bracket 16 to a distal end 22 for supporting a pedal pad 24. The driver 14 exerts a force against the pedal pad 24 to move the pedal pad 24 from the rest position to the use position. A support mechanism, shown generally at 26, interconnects the pedal arm 20 and the bracket 16 for allowing pivotal movement, indicated by the arrow A in FIG. 1, of the pedal arm 20 in an operating plane 28 relative to the bracket 16 during normal operation and for guiding the pedal arm 20 out of the operating plane 28 in response to a predetermined force between the pedal arm 20 and the bracket 16. Operating plane 28 is indicated by the dashed lines shown in FIG. 2.

The pre-determined force between the pedal arm 20 and the bracket 16 is based on collision forces resulting from the vehicle 10 colliding with another vehicle or some other object while the driver 14 has a foot placed against the pedal pad 24. Thus, the pedal assembly 12 is designed to pivot between the rest and use positions during normal operations when the driver 14 is applying normal forces against the pedal pad 24, i.e. the force applied to the pedal pad 24 is less than the pre-determined force. Once the driver 14 exerts a large force against the pedal pad 24, such as when the vehicle 10 is in a collision, and the pre-determined force is achieved, the support mechanism 26 is designed to give away and guide the pedal assembly 12 away from the driver 14 and out of the operating plane 28, as shown in FIG. 3.

The support mechanism 26 preferably includes a fastener 30, shown in detail in FIG. 4, for pivotally connecting the pedal arm 20 to the bracket 16 at a pivot axis 32. The fastener 30 is preferably a bolt, however, other fasteners well known in the art could also be use. The fastener 30 has a first end 34 fixed to the bracket 16 and a second end 36 moveable with respect to the bracket 16 between a first position where the pedal arm 20 is in the operating plane 28 and a second position where the pedal arm 20 is moved out of the operating plane 28. The second end 36 of the fastener 30 moves from the first position to the second position in response to the pre-determined force between the pedal arm 20 and the bracket 16. Thus, when the vehicle 10 is in a collision and the pre-determined force is achieved, the second end 36 of the fastener 30 moves while the first end 34 remains fixed, resulting in the pedal assembly 12 bending out of the way of the driver 14.

Figure 5:
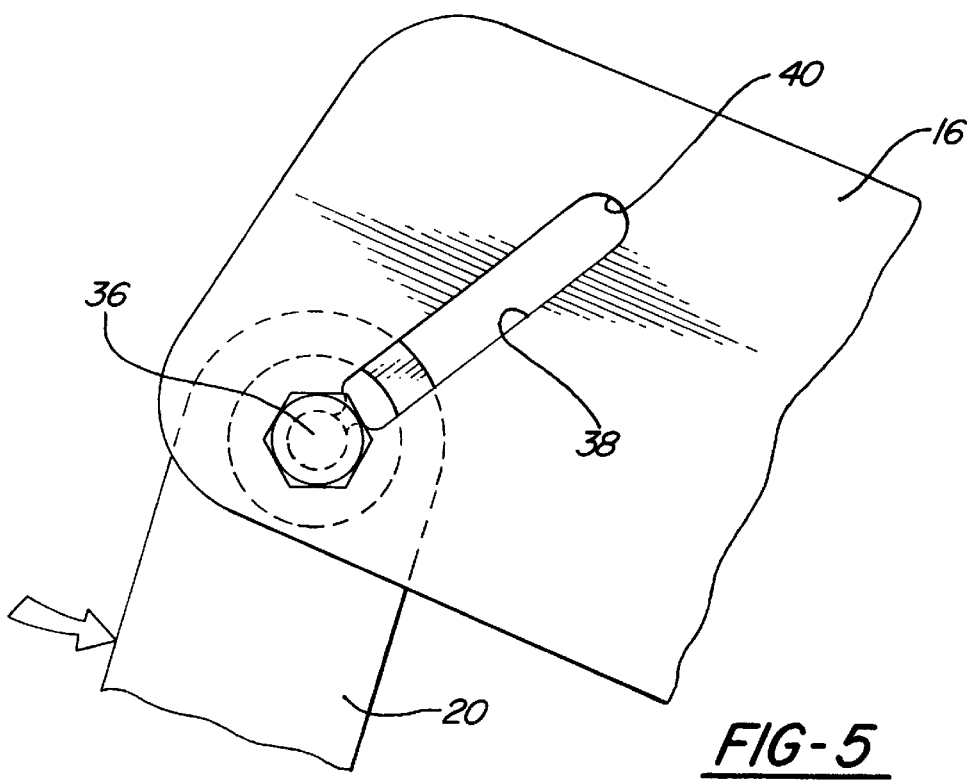
FIG. 5 is a side view, partially cut away, of the pedal assembly in a normal operating position.
Figure 6:
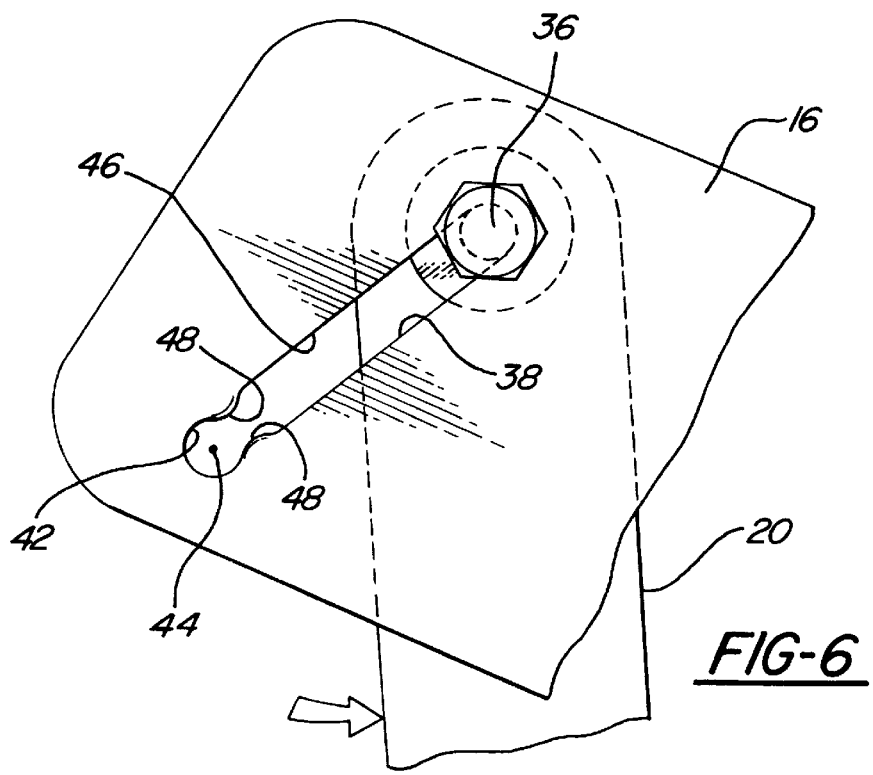
FIG. 6, is a side view, partially cut away, of the pedal assembly moved out of the normal operating position.

As shown in FIGS. 5 and 6, the bracket 16 preferably includes a slot 38 for receiving the second end 36 of the fastener 30. The slot 38 includes a first end 40 and a second end 42 with a semi-circular portion having a center 44 aligned with the pivot axis 32. The first 40 and second 42 ends are preferably interconnected by an elongated slot portion 46. The elongated slot portion 46 preferably extends from the first end 40 to the second end 42 at an angle relative to the pivot axis 32.

In the preferred embodiment, the slot 38 includes at least one extension 48 adjacent to the second end 42 of the slot and partially extending into the slot 38. The extension 48 retains the fastener 30 in the first position such that the pedal arm 20 can pivot about the pivot axis 32 during normal operation. The fastener 30 includes a body portion 50 for engaging the extension 48 when the force applied to the pedal pad 24 by the driver 14 equals or exceeds the pre-determined force such that the body portion 50 deforms and slides along the slot 38 causing the pedal arm 20 to bend away from the operating plane 28. Thus, when the pre-determined force is achieved, the body portion 50 of the fastener 30 is pressed against the extension 48 resulting in deformation of the fastener 30 and the extension 48 to allow the second end 36 of the fastener 30 to move along the slot 38 while the first end 34 remains fixed.

Preferably the slot 38 has at least two extensions 48 adjacent to the second end 42 of the slot 38 and partially extending opposite from one another into the slot 38. The extensions 48 retain the fastener 30 in the first position such that the pedal arm 20 can pivot about the pivot axis 32 during normal operation. When the force applied to the pedal pad 24 achieves the pre-determined force, the body portion 50 of the fastener 30 engages the extensions deforming or shearing the fastener 30 and the extensions 48 to allow the pedal assembly 12 to bend out of the operating plane 28 and away from the driver 14.

Figure 2:
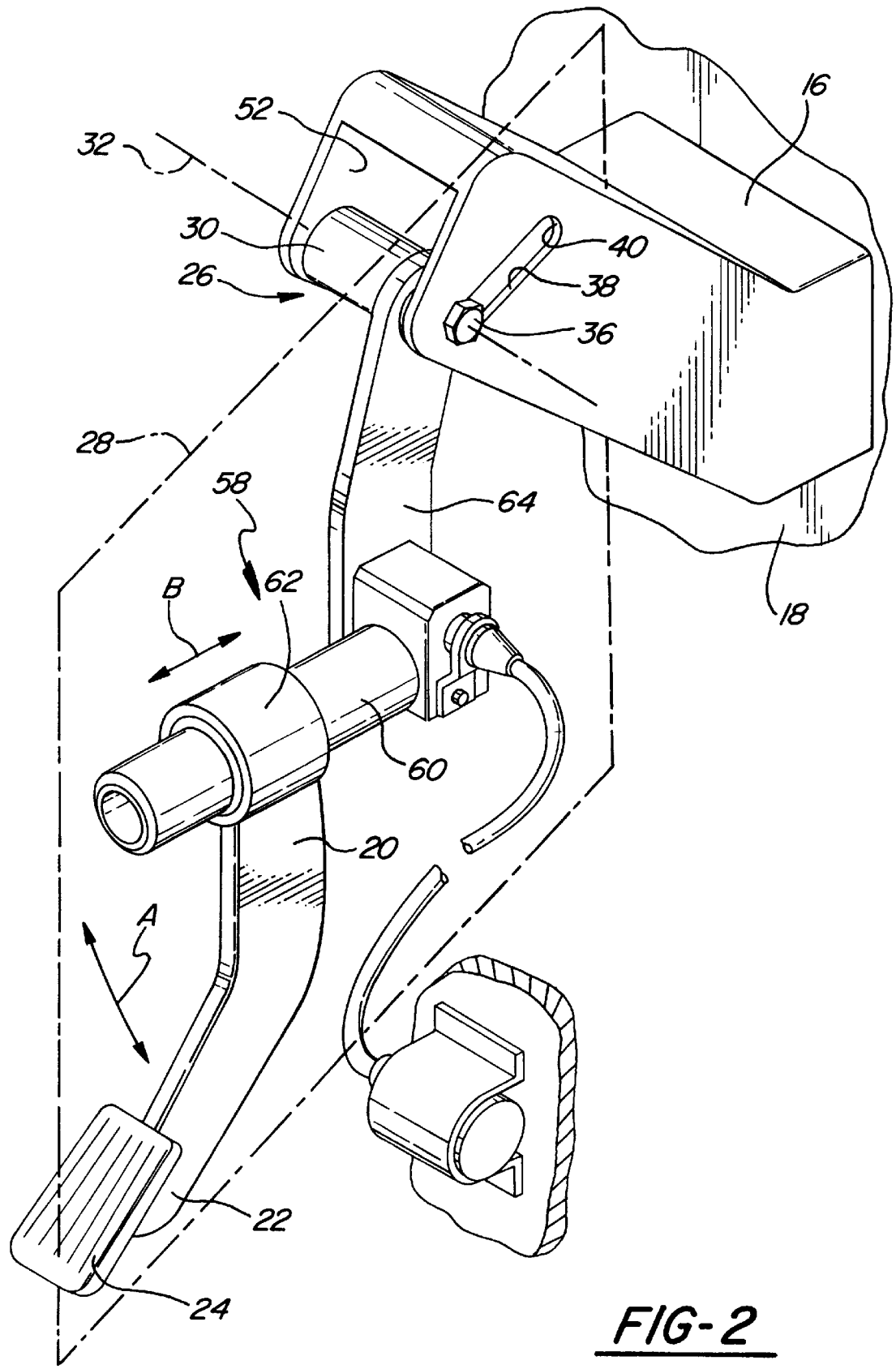
FIG. 2 is a perspective view of the pedal assembly pivoting in a normal operating plane.

The bracket 16 includes a first bracket portion 52 defining an aperture 54 for receiving the first end 34 of the fastener 30 and a second bracket portion 56 including the slot 38 for receiving the second end 36 of the fastener 30. As previously discussed, the slot 38 has one end 42 defining a center 44 that is aligned with the aperture 54 of the first bracket portion 52 along the pivot axis 32. The first bracket portion 52 can be a separate piece from the second bracket portion 56, or the first 52 and second 56 bracket portions can be integrally formed as shown in FIG. 2. Having a single bracket 16 with the first 52 and second 56 bracket portions being an integral part thereof is preferred because it reduces the overall number of parts for the pedal assembly 12.

When the pedal assembly 12 is in the normal operating position, the fastener is inserted through the aperture 54 and the slot 38 such that it extends between the first 52 and second 56 bracket portions along the pivot axis 32. When the pedal assembly 12 is moved out of the operating plane 28 the second end 36 of the fastener, i.e. the end 36 of the fastener 30 in the slot 38, is moved out of alignment with the pivot axis 32 while the first end 34 of the fastener 30 remains positioned on the pivot axis 32. Fixing the first end 34 of the fastener 30 allows the pedal assembly 12 to bend away from the driver 14, instead of merely moving away from the driver 14 in a linear fashion.

The pedal arm 20 is pivotally mounted to the fastener 30 adjacent to the slot 38. This positioning of the pedal arm 20 on the fastener 30 causes the force applied to the pedal pad 24 to be transferred to the fastener 30 near the second end 36. Thus, the pre-determined force required to cause the second end 36 of the fastener 30 to move along the slot 38 is determined in part by the positioning of the pivot support point of the pedal assembly 12 on the fastener 30 with respect to the bracket 16.

The support mechanism 26 is preferably used on a pedal assembly 12 that includes an adjustment apparatus, shown generally at 58, extending outwardly from the bracket 16. The adjustment apparatus 58 selectively moves the pedal arm 20 in fore and aft directions, as indicated by arrow B, with respect to the bracket 16 between a plurality of operable positions. The adjustment apparatus 58 preferably includes an outwardly extending guiderod 60 for supporting the pedal arm 20 for linear movement relative thereto. This adjustment apparatus 58 is of the type shown in U.S. Pat. No. 5,632,183 which is issued to the assignee of the subject invention of this application.

The adjustment apparatus 58 includes a cylindrical tube portion 62 from which the pedal arm 20 extends. The tube portion 62 moves fore and aft along the guiderod 60 when electrically actuated. The driver 14 selectively controls the position of the pedal assembly 12 by actuating an electrical control mechanism (not shown). While the preferred adjustment apparatus 58 includes the guiderod 60 and cylindrical tube 62 configuration, any type of adjustment apparatus including other adjustment apparatuses 58 well known in the art could also be used.

As mentioned above, the support mechanism 26 includes a fastener 30 for pivotally connecting the pedal assembly 12 to the bracket 16 at the pivot axis 32. The adjustment assembly 58 includes an arm 64 that is pivotally mounted to the fastener 30 and extends downwardly therefrom. The arm 64 is connected to the guiderod 60 which extends outwardly from the arm 64 toward the driver 14. The pedal assembly 12 is supported on the guiderod 60 for linear movement with respect to the guiderod 60 and for pivotal movement with respect to the bracket 16 about the pivot axis 32.

The first end 34 of the fastener is fixed to the bracket 16 and the second end 36 is moveable with respect to the bracket 16 such that the adjustment apparatus 58 is moved out of the operating plane 58 along with the pedal assembly 12 in response to the predetermined force between the pedal arm 20 and the bracket 16. Thus, the support mechanism 26 that interconnects the adjustment apparatus 58 and the bracket 16 moves the pedal arm 20 and the adjustment apparatus 58 laterally relative to the bracket 16 when the force applied to the pedal pad 24 exceeds the pre-determined force.

During normal operation, the pedal arm 20 will pivot about the pivot axis 32 when the driver 14 applies a force to the pedal pad 24 to move the pedal arm from the rest position to the use position thereby activating the corresponding vehicle control system. When the vehicle 10 is in a collision and the driver 14 has applied a high force against the pedal pad 24 in one direction and is opposed by a collision force in an opposing direction, the support mechanism 26 controls the movement of the pedal assembly 12 and the adjustment apparatus 58 with respect to the bracket 16. Thus, when the vehicle 10 collides with another object and the pedal assembly 12 and other pedal components begin to move toward the driver 14, the support mechanism 26 guides the pedal arm 20, the pedal pad 24, and the adjustment apparatus 58 in a lateral direction with respect to the bracket 16 and away from the driver 14. This support mechanism 26 controls the movement of these components so that the driver 14 will not be injured by coming into contact with the pedal assembly 12 and/or adjustment apparatus 58 during a collision.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A pedal assembly comprising:
    a bracket (16) adapted to be mounted to a vehicle structure (18);
    a pedal arm (20) extending downwardly from said bracket (16) to a distal end (22) for supporting a pedal pad (24),
    a support mechanism (26) interconnecting said pedal arm (20) and said bracket (16) for allowing pivotal movement of said pedal arm (20) in an operating plane (28) relative to said bracket (16) during normal operation and for guiding said pedal arm (20) out of said operating plane (28) in response to a predetermined force between said pedal arm (20) and said bracket (16); and
    an adjustment apparatus (58) extending outwardly from said bracket (16) for selectively moving said pedal arm (20) in fore and aft directions with respect to said bracket (16) between a plurality of operable positions;
    said support mechanism (26) including a fastener (30) for pivotally connecting said adjustment apparatus (58) to said bracket (16) at a pivot axis (32) wherein said fastener (30) includes a first end (34) fixed to said bracket (16) and a second end (36) moveable with respect to said bracket (16) such that said adjustment apparatus (58) is moved out of said operating plane (28) in response to the predetermined force between said pedal arm (20) and said bracket (16).

2. A pedal assembly comprising:
    a bracket (16) adapted to be mounted to a vehicle structure (18);
    a pedal arm (20) extending downwardly from said bracket (16) to a distal end (22) for supporting a pedal pad (24) and normally movable in a longitudinally orientated operating plane (28) relative to said bracket (16), and
    characterized by a support mechanism (26) interconnecting said pedal arm (20) and said bracket (16) for moving said pedal arm (20) laterally relative to said bracket (16) and out of said operating plane (28) when a force applied to said pedal pad (24) exceeds a pre-determined force wherein said support mechanism (26) includes a first end and a second end, said first end being fixed with respect to said bracket (16) and said second end being moveable with respect to said first end for allowing said pedal arm (20) to pivot in said operating plane (28) relative to said bracket (16) during normal operation and moving said pedal arm (20) transversely to said operating plane (28) when the force applied to said pedal pad (24) exceeds said pre-determined force.

3. A pedal assembly comprising:
    a bracket (16) adapted to be mounted to a vehicle structure (18);
    a pedal arm (20) extending downwardly from said bracket (16) to a distal end (22) for supporting a pedal pad (24), and
    characterized by a support mechanism (26) interconnecting said pedal arm (20) and said bracket (16) for allowing pivotal movement of said pedal arm (20) in an operating plane (28) relative to said bracket (16) during normal operation and for guiding said pedal arm (20) out of said operating plane (28) in response to a predetermined force between said pedal arm (20) and said bracket (16), said support mechanism (26) including a fastener (30) for pivotally connecting said pedal arm (20) to said bracket (16) at a pivot axis (32) wherein said fastener (30) has a first end (34) fixed to said bracket (16) and a second end (36) moveable with respect to said bracket (16) between a first position where said pedal arm (20) is in said operating plane (28) and a second position where said pedal arm (20) is moved out of said operating plane (28), said second end (36) of said fastener (30) moving from said first position to said second position in response to said pre-determined force between said pedal arm (20) and said bracket (16).

4. An assembly as set forth in claim 3 wherein said bracket (16) includes a slot (38) for receiving said second end (36) of said fastener (30).

5. An assembly as set forth in claim 4 wherein said slot (38) includes a first end (40) and a second end (42) with a semi-circular portion having a center (44) aligned with said pivot axis (32), said first (40) and second (42) ends interconnected by an elongated slot portion (46).

6. An assembly as set forth in claim 5 wherein said elongated slot portion (46) extends from said second end (42) to said first end (40) at an angle relative to said pivot axis (32).

7. An assembly as set forth in claim 6 including at least two extensions (48) adjacent to said second end (42) of said slot (38) and partially extending opposite from one another into said slot (38), said extensions (48) for retaining said fastener (30) in said first position such that said pedal arm (20) can pivot about said pivot axis (32) during normal operation.

8. An assembly as set forth in claim 5 including an extension (48) adjacent to said second end (42) of said slot (38) and partially extending into said slot (38), said extension (48) for retaining said fastener (30) in said first position such that said pedal arm (20) can pivot about said pivot axis (32) during normal operation.

9. An assembly as set forth in claim 8 wherein said fastener (30) includes a body portion (50) for engaging said extension (48) when a force applied to said pedal pad (24) exceeds said pre-determined force such that said body portion (50) deforms and slides along said slot (38) causing said pedal arm (20) to bend away from said operating plane (28).

10. A pedal assembly comprising:

a bracket (16) adapted to be mounted to a vehicle structure (18);

a pedal arm (20) extending downwardly from said bracket (16) to a distal end (22) for supporting a pedal pad (24) and normally movable in a longitudinally orientated operating plane (28) relative to said bracket (16), and characterized by a support mechanism (26) interconnecting said pedal arm (20) and said bracket (16) for moving said pedal arm (20) laterally relative to said bracket (16) and out of said operating plane (28) when a force applied to said pedal pad (24) exceeds a pre-determined force wherein said support mechanism (26) includes a fastener (30) for pivotally connecting said pedal arm (20) to said bracket (16), said fastener (30) having a first end (34) fixed to said bracket (16) prohibiting movement relative thereto and a second end moveable with respect to said bracket (16).

11. An assembly as set forth in claim 10 wherein said pedal arm (20) is supported on said fastener (30) adjacent to said second end (36) such that when the force applied to said pedal pad (24) exceeds said pre-determined force said second end (36) of said fastener (30) moves with respect to said bracket (16) resulting in said pedal arm (20) rotating with respect to said bracket (16).

* * * * *